US006262860B1

(12) United States Patent
Ishida

(10) Patent No.: US 6,262,860 B1
(45) Date of Patent: *Jul. 17, 2001

(54) MAGNETIC DISK APPARATUS WITH RECESSED TRACKING SERVO MARKS

(75) Inventor: Takehisa Ishida, Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,129

(22) Filed: Apr. 16, 1998

(30) Foreign Application Priority Data

Apr. 21, 1997 (JP) .................................... 9-103655

(51) Int. Cl.[7] .................................................. G11B 5/596
(52) U.S. Cl. ......................... 360/78.05; 360/48; 360/135; 360/77.08
(58) Field of Search .......................... 360/61, 63, 78.04, 360/78.05, 78.08, 78.12, 98.01, 98.02, 104, 105, 106, 48, 77.02, 77.07, 135, 77.08

(56) References Cited

U.S. PATENT DOCUMENTS

| | | | |
|---|---|---|---|
| 4,858,040 | * 8/1989 | Hazebrouck ................. | 360/78.12 X |
| 5,189,578 | * 2/1993 | Mori et al. ..................... | 360/78.05 X |
| 5,341,351 | * 8/1994 | Ng ................................. | 360/78.12 X |
| 5,355,486 | * 10/1994 | Corby ............................ | 360/78.12 X |
| 5,537,282 | * 7/1996 | Traves et al. ................. | 360/77.01 X |
| 5,590,009 | * 12/1996 | Ishida ............................ | 360/135 |
| 5,610,808 | * 3/1997 | Squires et al. ................ | 360/78.12 X |
| 5,723,033 | * 3/1998 | Weiss ............................. | 360/135 X |
| 5,875,083 | * 2/1999 | Oniki et al. .................... | 360/135 |
| 5,901,010 | * 5/1999 | Glover et al. ................. | 360/78.12 |
| 5,907,448 | * 5/1999 | Watanabe et al. ............ | 360/77.04 |

* cited by examiner

Primary Examiner—Andrew L. Sniezek
(74) Attorney, Agent, or Firm—Jay H. Maioli

(57) ABSTRACT

A magnetic disk apparatus includes head bases placed one on another and supported for pivotal motion on a common pivot shaft, and sliders provided at free ends of the head bases and having magnetic heads mounted thereon with suspensions interposed therebetween, respectively. A coil for a voice coil motor serving as a first driving apparatus is provided on the opposite side to the sliders with respect to the pivot shaft. Second driving apparatus formed from piezoelectric elements and hinges are provided between the pivot shaft and the sliders. For faces of a plurality of magnetic disks, recording and/or reproduction operations can be performed simultaneously by integral tracking control of the sliders by the first driving apparatus and individual tracking control of the sliders by the second driving apparatus.

1 Claim, 11 Drawing Sheets

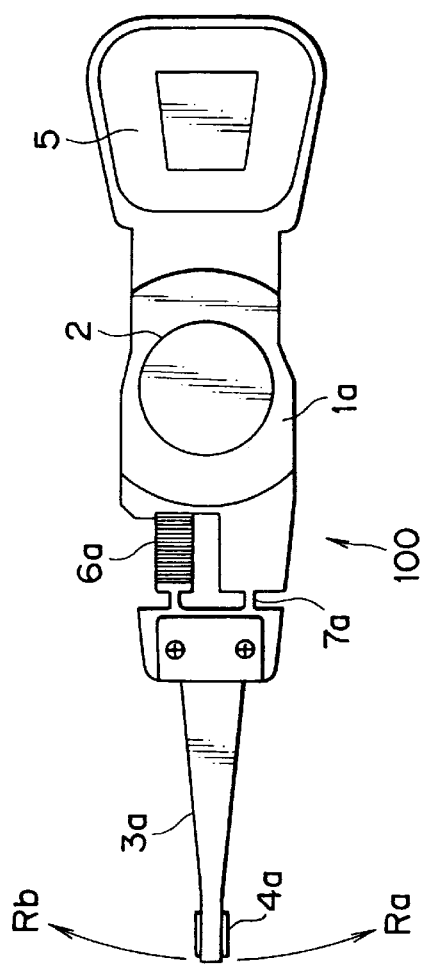
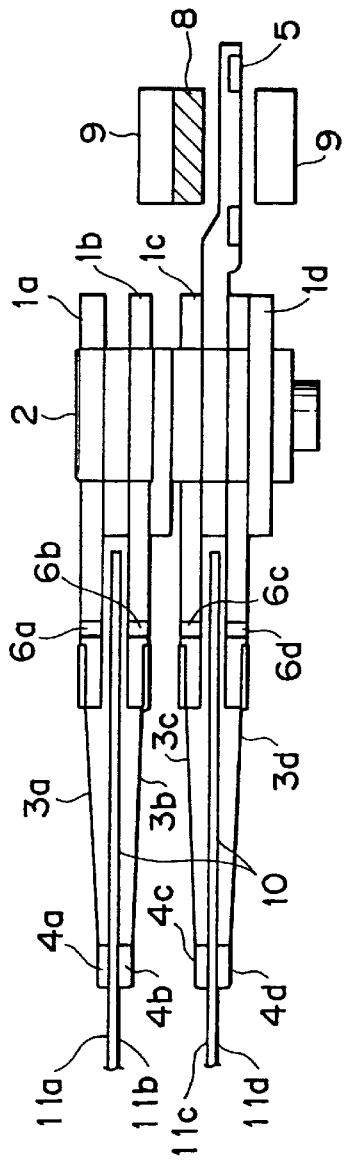
FIG. 1A
FIG. 1B

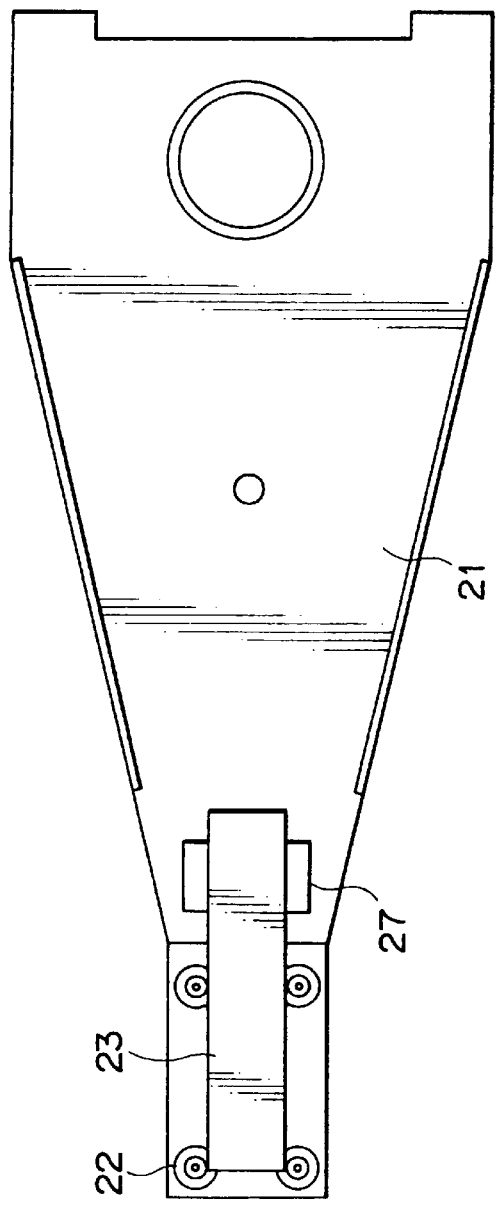
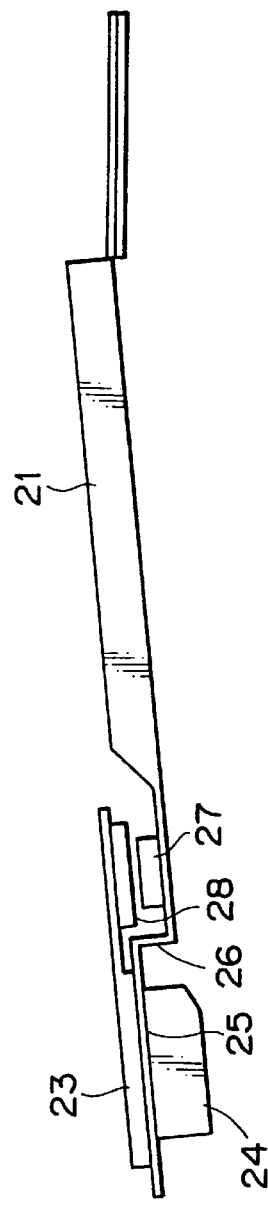
FIG. 2A
FIG. 2B

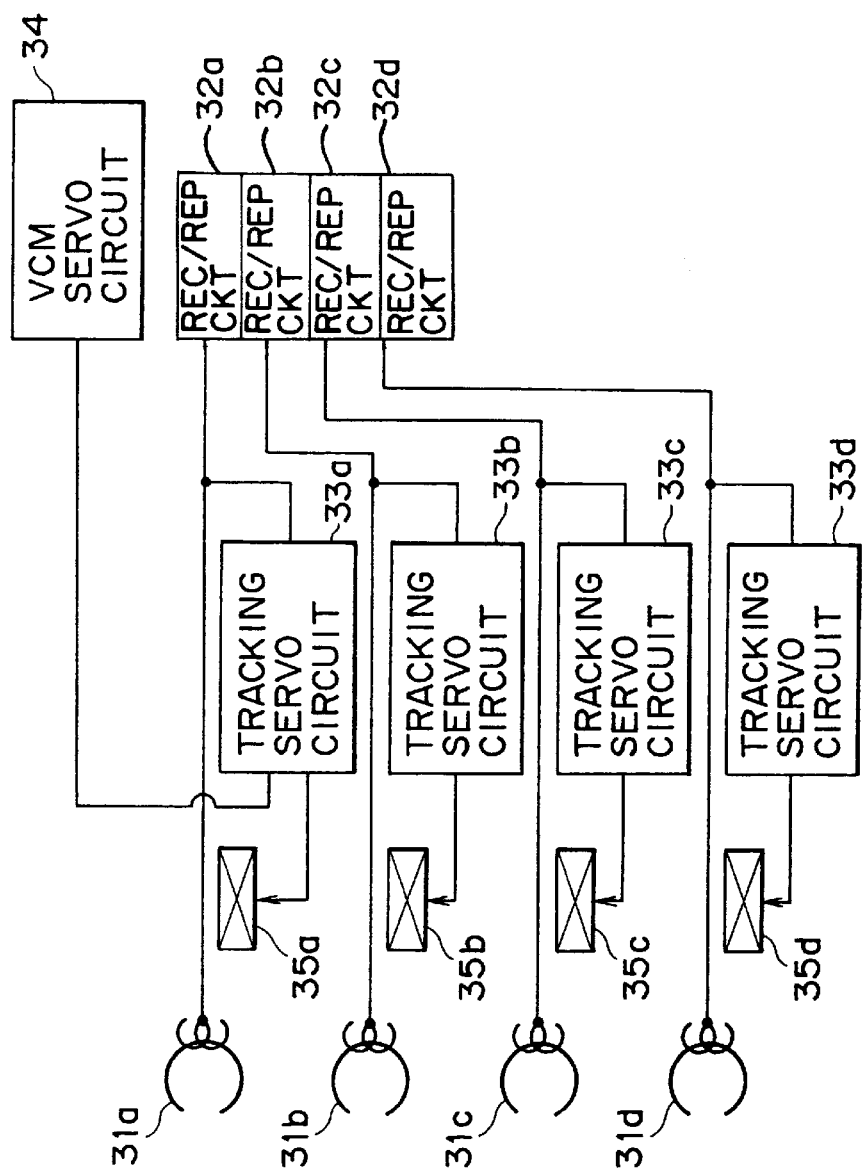

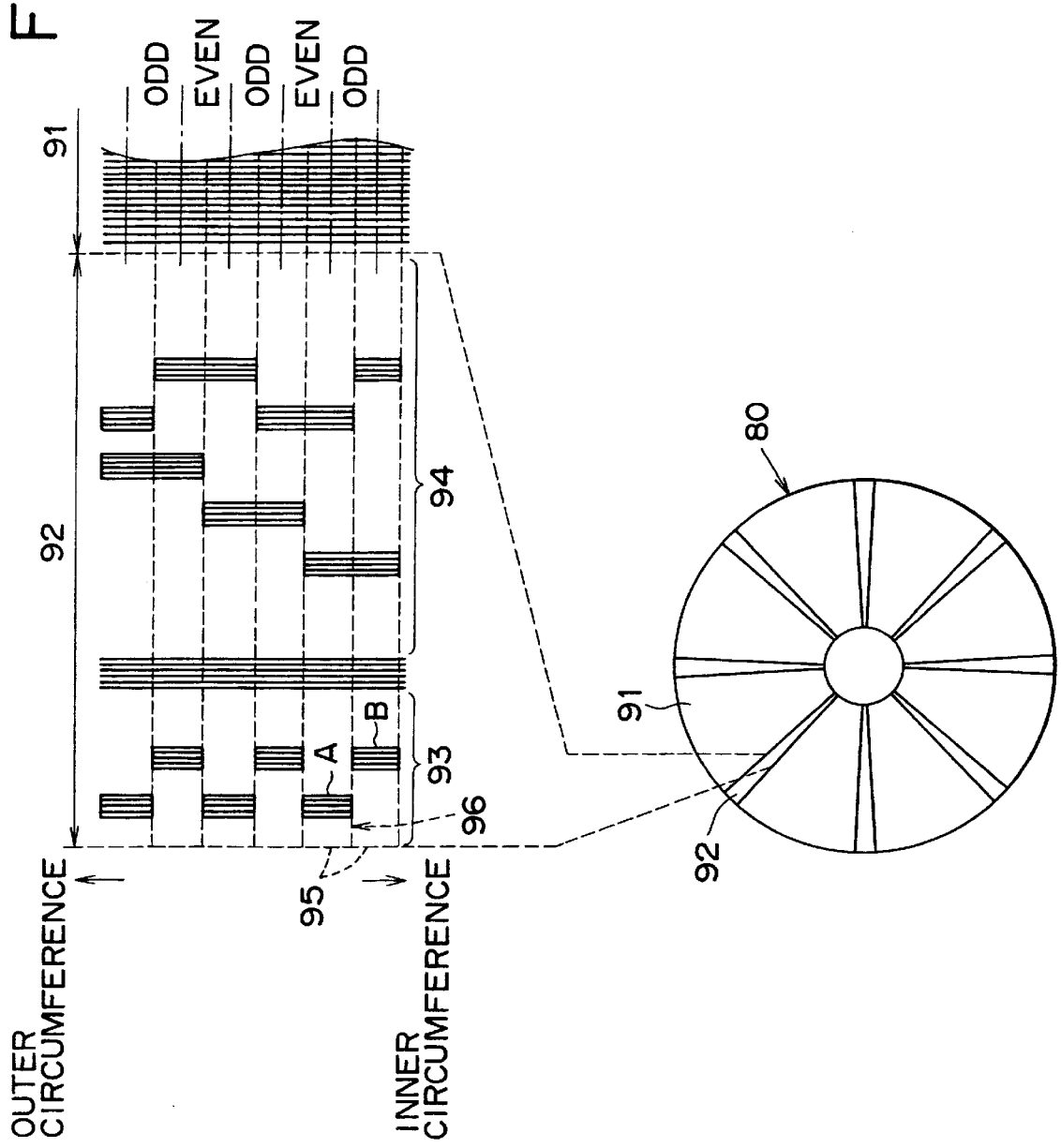

MAGNETIC DISK APPARATUS WITH RECESSED TRACKING SERVO MARKS

BACKGROUND OF THE INVENTION

This invention relates to a magnetic disk apparatus which is used as a storage apparatus for a computer, a video apparatus or a like apparatus, and more particularly to a magnetic disk apparatus which allows high speed recording and reproduction of data.

Various magnetic apparatus are known, and an exemplary one of related art magnetic disk apparatus is described with reference to FIG. 10 which shows a general construction of a magnetic disk apparatus and FIG. 11 which illustrates tracking control of the magnetic disk apparatus of FIG. 10.

Referring first to FIG. 10, the magnetic disk apparatus 110 shown includes a plurality of magnetic disks 80 secured to a spindle 81 in a predetermined spaced relationship from each other, and a plurality of magnetic heads 82 for recording and reproduction individually provided for the magnetic disks 80. The magnetic disk apparatus 110 further includes a carriage 84 on which a plurality of pivotal arms 83 are held in a connected condition to each other, a bearing 85 for supporting the carriage 84 for pivotal motion thereon, a voice coil motor (VCM) 86 for generating a pivoting force for the carriage 84, a load beam 87 provided on each of the pivotal arms 83 which are pivoted by the voice coil motor 86, and a slider 88 provided at a free end of the load beam 87. The slider 88 is made of a ceramics material or the like, and a magnetic head 82 for recording and reproduction formed by a thin film technique or a like technique is placed at a free end of the slider 88.

Referring now to FIG. 11, each of the magnetic disks 80 employed in the magnetic disk apparatus 110 having the construction described above is circumferentially divided into sectoral data areas 91 and servo areas 92. Further, each of the servo areas 92 is divided into servo mark areas 93 and address code areas 94, in which servo marks A and B and address codes are recorded, respectively. A tracking error signal for the magnetic heads 82 is produced based on reproduction signals of several tens of the servo marks A and B located on each one circumference of each of the magnetic disks 80.

In each of the servo mark areas 93, a servo mark A and a servo mark B are provided on the opposite sides of a track center 96 of each of tracks 95. Each of the servo marks A and B is formed from a burst of repetitive magnetization reversals, and a tracking error signal for the magnetic heads 82 is obtained depending upon a difference between the recorded positions of the servo marks A and B and a magnitude of a reproduction output.

Subsequently, production of a tracking error signal mentioned above is described.

First, it is assumed that a magnetic head 82 is positioned at an odd-numbered track and is thereafter displaced to the outer circumferential side of the disk. In this instance, the reproduction signal from the servo mark A increases in magnitude while the reproduction signal from the servo mark B decreases in magnitude. However, if the magnetic head 82 is displaced conversely to the inner circumferential side, then the reproduction signal from the service mark B increases while the reproduction signal from the service mark A decreases.

Now, it is assumed that the magnetic head 82 is positioned at an even-numbered track and is thereafter displaced to the outer circumferential side. In this instance, the reproduction signal from the servo mark B increases in magnitude while the reproduction signal of the servo mark A decreases in magnitude. However, if the magnetic head 82 is displaced conversely to the inner circumferential side, then the reproduction signal from the service mark A increases while the reproduction signal from the service mark B decreases.

Consequently, the direction in which the magnetic head 82 is displaced can be discriminated from the magnitudes of the reproduction signals of the servo marks A and B and distinction between an even number and an odd number of the track address recorded in the address code area 94 of the track 95 at which the magnetic head 82 is positioned, and tracking control of the magnetic head 82 is performed based on the information.

A tracking error signal is obtained from the track address from which reproduction by the magnetic head 82 is performed and the magnitudes of the reproduction signals of the servo marks A and B as described above, and the voice coil motor 86 is driven based on the tracking error signal so that the magnetic head 82 may be positioned on the track center 96 to effect tracking control.

However, since the tracking control described above is performed for one magnetic head selected from the plurality of magnetic heads, usually the other magnetic heads are not registered fully with opposing tracks of corresponding magnetic disks. In other words, from dispersions of the mounted positions of the magnetic heads, the thermal expansions and the vibration modes of the pivotal arms and the load beams on which the magnetic heads are carried and so forth, only the selected magnetic head is controlled to a tracking condition optimum to recording and reproduction. Accordingly, simultaneous recording and/or reproduction by a plurality of magnetic heads is practically unavailable.

In recent years, as development of multimedia proceeds, demands for various video services of a high quality are increasing, and demands also for video servers or non-linear video editing systems which have higher performances and higher functions than video tape recorders are increasing for production and sending out of video information. Here, a "non-linear" system signifies a system wherein a tape is not used as a recording medium.

A disk apparatus which is superior in high speed accessing is suitable for use with a non-linear video editing system. However, even though a magnetic disk apparatus which has exhibited development as, for example, an external storage apparatus for a computer includes a plurality of built-in magnetic disks as described above, the magnetic disk apparatus allows a recording or reproducing operation only by a selected one magnetic head so that the data transferring rate is limited to approximately 30 Mbit/sec. Therefore, in order to obtain a data transfer rate of 100 Mbit/sec or more which is demanded for a non-linear video editing system or the like, a plurality of magnetic disk apparatus must operate in parallel to each other. This increases the scale and the cost of the system, and consequently, systems of the type mentioned are actually used in only limited applications.

SUMMARY OF THE INVENTION

It is an object of the present invention to provide a magnetic disk apparatus suitable for use with a non-linear video editing system or a like system which is superior in high speed accessing and capable of recording and reproducing data at a high speed and can provide high quality video services.

In order to attain the object described above, according to the present invention, there is provided a magnetic disk apparatus which includes one or more disk type magnetic recording media securely mounted on a rotary shaft of a rotational driving apparatus, and a plurality of magnetic heads individually provided for recording faces of the disk type magnetic recording medium or media to perform recording and reproduction, comprising a plurality of recording signal processing means individually provided for the magnetic heads, a plurality of reproduction signal processing means individually provided for the magnetic heads, recording signal control means for controlling a relationship of recording signals to be inputted to the magnetic heads, reproduction signal control means for controlling a relationship of reproduction signals outputted from the magnetic heads, first driving means for pivoting all of the magnetic heads integrally with each other to position the magnetic heads roughly to predetermined information tracks of the corresponding recording faces of the disk type magnetic recording medium or media, and a plurality of second driving means individually provided for the magnetic heads for positioning the corresponding magnetic heads precisely to the predetermined information tracks of the corresponding recording faces of the disk type magnetic recording medium or media, all of the magnetic heads being pivoted integrally with each other by the first driving means so as to be positioned roughly to the predetermined information tracks, whereafter the magnetic heads are individually positioned precisely to the predetermined information tracks of the corresponding recording surfaces of the disk type magnetic recording medium or media by the second driving means.

With the magnetic disk apparatus, the plurality of magnetic heads are driven by the first driving means for pivoting all of the magnetic heads integrally with each other and the plurality of second driving means individually provided for the magnetic heads for individually controlling the positions of the corresponding magnetic heads. Consequently, the magnetic heads can perform recording and/or reproduction operations simultaneously for the plurality of recording surfaces of the disk type magnetic recording medium or media. Accordingly, the data transfer rate is augmented remarkably.

The magnetic disk apparatus may further comprise a plurality of inputting means individually provided for the magnetic heads for inputting serial data trains to be recorded, and a plurality of outputting means individually provided for the magnetic heads for outputting reproduced serial data trains, whereby a plurality of data trains are recorded and/or reproduced simultaneously. With the magnetic disk apparatus, different serial data can be recorded by the magnetic heads, and accordingly, the magnetic disk apparatus can be applied to multi-channel applications.

The recording signal control means may include means for converting serial data to be recorded into parallel data which individually correspond to the magnetic heads while the reproduction signal control means includes means for converting parallel data outputted from the magnetic heads into serial data, whereby serial data are recorded in parallel whereas recorded parallel data are reproduced as serial data. With the magnetic disk apparatus, since serial data can be recorded in parallel whereas data recorded in parallel can be reproduced as serial data, the data transfer rate can be augmented.

Preferably, the disk type magnetic recording medium has a signal for detecting tracking errors recorded in advance thereon. The disk type magnetic recording medium eliminates the necessity for initialization for tracking serving thereof, and consequently, the operability is augmented.

Preferably, the disk type magnetic recording medium is removably and exchangeably loaded in the magnetic disk apparatus. In this instance, the disk type magnetic recording medium is advantageous not only in the high speed data transfer function but also in that it can be transported in an already recorded condition and loaded into another production apparatus or the like readily.

The magnetic disk apparatus according to the present invention which have such advantages as described above exhibits a remarkable effect where it is applied to a video server or a non-linear video editing system having high performances and high functions.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 1A and 1B are a plan view and a side elevational view, respectively, of a head positioning mechanism of a magnetic disk apparatus to which the present invention is applied;

FIGS. 2A and 2B are a plan view and a side elevational view, respectively, of another head positioning mechanism of the magnetic disk apparatus to which the present invention is applied;

FIG. 4 is a block diagram of a servo system employed in the magnetic disk apparatus to which the present invention is applied;

FIG. 11 is a diagrammatic view illustrating related art tracking control of a magnetic disk.

DESCRIPTION OF THE PREFERRED EMBODIMENT

Figure 3A:
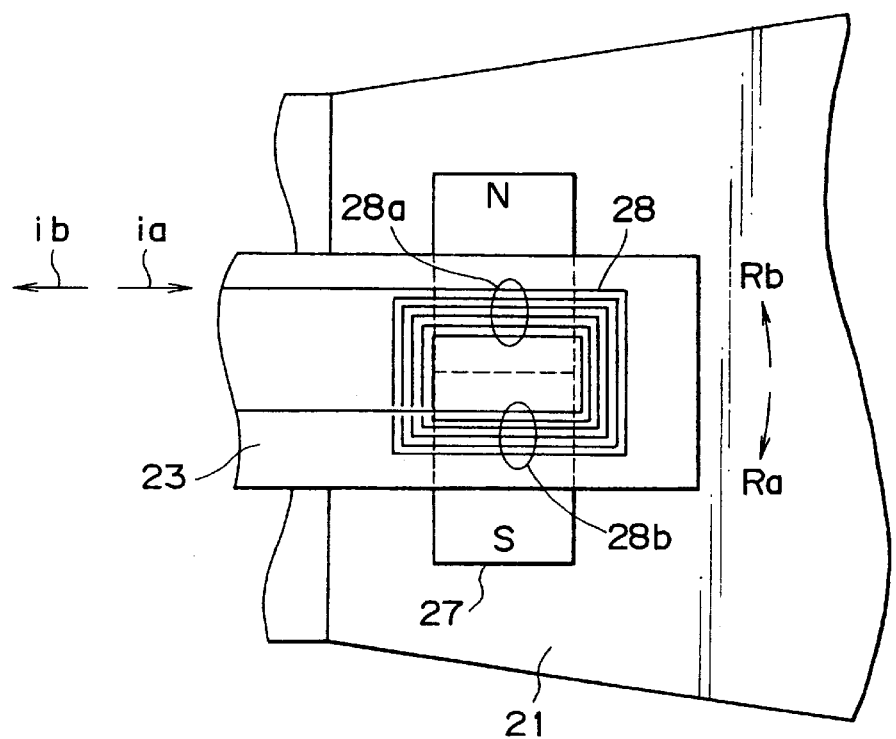
FIG. 3A is a partial plan view illustrating generation of driving force of the head positioning mechanism of FIGS. 2A and 2B and FIG. 3B is a partial perspective view illustrating holding and operation of a slider of the head positioning mechanism.

Referring first to FIGS. 1A and 1B, there is shown a head positioning mechanism employed in a magnetic disk apparatus to which the present invention is applied. The head positioning mechanism shown is generally denoted at 100 and includes head bases 1a to 1d placed one on another and supported for pivotal motion on a pivot shaft 2, and sliders 4a to 4d provided at free ends of the head bases 1a to 1d and having magnetic heads mounted thereon with suspensions 3a to 3d interposed therebetween, respectively. A coil 5 for a voice coil motor serving as a first driving apparatus is provided on the opposite side to the sliders 4a to 4d with respect to the pivot shaft 2. Further, second driving apparatus formed from piezoelectric elements 6a to 6d and hinges 7a to 7d are provided between the pivot shaft 2 and the sliders 4a to 4d, respectively.

The first driving apparatus is constructed such that a voice coil motor is formed from the coil 5, a magnet 8 and a yoke 9 as seen in FIG. 1B, and the sliders 4a to 4d are pivoted integrally with each other in the direction indicated by an arrow mark Ra or another arrow mark Rb of FIG. 1A depending upon the current flowing through the coil 5.

Meanwhile, the second driving apparatus are provided individually for the head bases 1a to 1d, and the sliders 4a to 4d are pivoted in the direction of the arrow mark Ra or the arrow mark Rb around the hinges 7a to 7d depending upon voltages applied to the piezoelectric elements 6a to 6d, respectively.

Each of the sliders 4a to 4d of the second driving apparatus described above, and consequently, each of the magnetic heads provided on the sliders 4a to 4d, is tracking controlled so as to trace servo marks provided corresponding to a recording track of a magnetic disk 10, which will be hereinafter described in detail. Thus, for faces 11a to 11d of the plurality of magnetic disks 10, recording and/or reproduction operations can be performed simultaneously by integral tracking control of the sliders 4a to 4d by the first driving apparatus and individual tracking control of the sliders 4a to 4d by the second driving apparatus.

FIGS. 2A and 2B show an example of a second driving apparatus which makes use of electromagnetic force. The second driving apparatus shown includes a load beam 21 formed from a thin plate of stainless steel as shown in FIG. 2A, a movable element 23 held at a free end of the load beam 21 by springs 22 as seen in FIG. 2A, and a slider 25 provided on the opposite side to the movable element 23 with respect to the springs 22 and having a magnetic head 24 provided thereon. Meanwhile, a magnet 27 is secured to the load beam 21 on the opposite side to the magnetic head 24 with respect to a bent portion 26 of the load beam 21, and a coil 28 is provided on the movable element 23 in an opposing relationship to the magnet 27. Driving force of the second driving apparatus is generated by the magnet 27 and the coil 28.

The load beam 21 is formed by press work, and the springs 22 are formed by etching or discharge wire working. Further, the coil 28 is formed from a thin film of metal or the like on an insulating layer of polyimide or a like material applied to the movable element 23 using a method which is used for production of a flexible printed circuit board. It is to be noted that the coil may be formed by a winding wire in place of the flexible printed circuit board.

Referring to FIG. 3A, the magnet 27 is divided at a central portion thereof and individually magnetized to the N and S poles. Meanwhile, the coil 28 has coil side 28a provided opposing to the N pole and coil side 28b provided opposing to the S pole. Thus, when current ia flows through the coil 28, the coil sides 28a cooperate with the N pole and the coil sides 28b cooperate with the S pole to generate force acting in the direction indicated by the arrow mark Ra. On the contrary, if current ib flows in the opposite direction, then force acting in the arrow mark Rb is generated. Consequently, the movable element 23 can be driven in any one of the two directions. The force generated is transmitted to the magnetic head 24 so that the magnetic head 24 may be pivoted around a fulcrum provided by the four springs 22 to effect accurate tracking control to an information track.

Figure 3B:
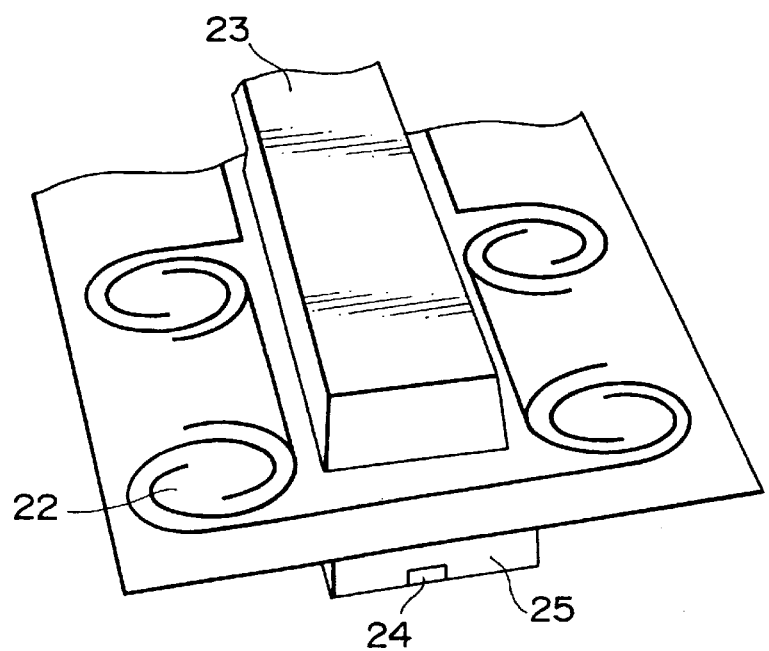

FIG. 3B is a perspective view as viewed from a free end side of the movable element 23 and shows arrangement of the four springs 22 each formed in a spiral shape, the movable element 23 secured to a part formed by the four springs 22 and movable to the left and right, and the slider 25 provided on the opposite side to the movable element 23 with respect to the springs 22 and having the magnetic head 24 thereon.

It is to be noted that the spring structure is not limited to the specific one described above, but may have any structure only if it has a structure which allows the movable element 23 to move in a radial direction of a magnetic disk on a surface of the disk.

Further, the arrangement of the magnet 27 and the coil 28 may naturally be reversed to that described above.

Subsequently, a method of controlling the head positioning mechanism 100 described above is described with reference to FIG. 4.

Reproduction signals of magnetic heads 31a to 31d provided on the sliders 4a to 4d shown in FIG. 1 are inputted to recording and reproduction circuits 32a to 32d and tracking servo circuits 33a to 33d, respectively. The tracking servo circuits 33a to 33d detect tracking error signals of tracks to which the magnetic heads 31a to 31d are opposed, respectively. Meanwhile, the output of a predetermined magnetic head, particularly in FIG. 4, the magnetic head 31a, is processed by the tracking servo circuit 33a and is supplied to a voice coil motor (VCM) servo circuit 34 to control the voice coil motor serving as the first driving apparatus in order to control the magnetic heads 31a to 31d integrally with each other. Further, the individual tracking error signals are supplied, after being signal processed, to second driving apparatus 35a to 35d, by which tracking control of the magnetic heads 31a to 31d is performed, respectively.

Figure 5:
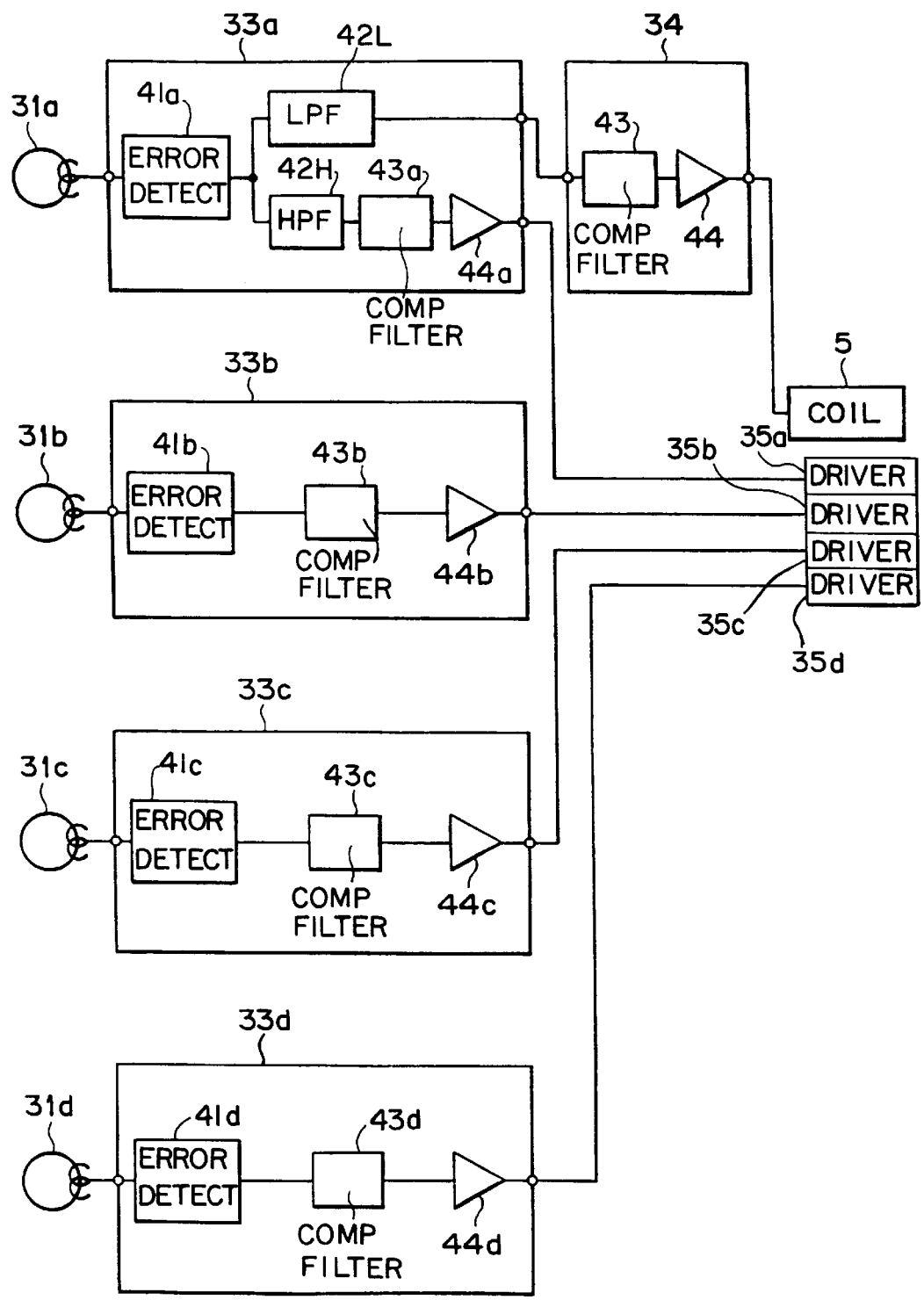
FIG. 5 is a block diagram showing a more detailed circuit construction of the servo system of FIG. 4.

The tracking servo circuits 33a to 33d are constructed in such a manner as shown in FIG. 5. Referring to FIG. 5, the output of the magnetic head 31a is inputted to the tracking servo circuit 33a, in which a tracking error signal is separated from the output of the magnetic head 31a by a position error detector 41a. In the tracking servo circuit 33a, the tracking error signal is passed through a low-pass filter 42L to extract low error components of a frequency band and then supplied to the VCM servo circuit 34, so as to be supplied to the first driving apparatus. In the VCM servo circuit 34, the output of the low-pass filter 42L is processed by a characteristic compensation filter 43, an amplifier 44 and so forth. Then, an output of the VCM servo circuit 34 is supplied to the coil 5 of the voice coil motor, by which integral tracking control of the magnetic heads 31a to 31d is performed. Meanwhile, the tracking control signal outputted from the position error detector 41a is also passed through a high-pass filter 42H to extract high error components of the frequency band and then processed successively by a characteristic compensation filter 43a, an amplifier 44a and so forth, whereafter it is supplied to the second driving apparatus 35a, by which accurate tracking control of the magnetic head 31a is performed based on the tracking control signal.

Also the outputs of the magnetic heads 31b to 31d are supplied to the tracking servo circuits 33b to 33d, in which tracking error signals are separated from the outputs of the magnetic heads 31b to 31d by position error detectors 41b to 41d and are successively processed by characteristic compensation filters 43b to 43d, amplifiers 44b to 44d and so forth, respectively. The tracking error signals are thereafter supplied to the second driving apparatus 35b to 35d, by which accurate tracking control of the magnetic heads 31b to 31d is performed, respectively.

It is to be noted that, while, in the description above, the output of the magnetic head 31a is used for control of the first driving apparatus, the output of any other one of the magnetic heads may be used instead, or alternatively, a signal to be supplied to the first driving apparatus may be calculated based on the outputs of all of the magnetic heads.

Further, the reason why the high-pass filter 42H is provided only for the tracking servo circuit 33a is that, as the signal of the magnetic head 31a is used for both of the first control apparatus and the second control apparatus, it is necessary to separate control bands for them.

Figure 6:
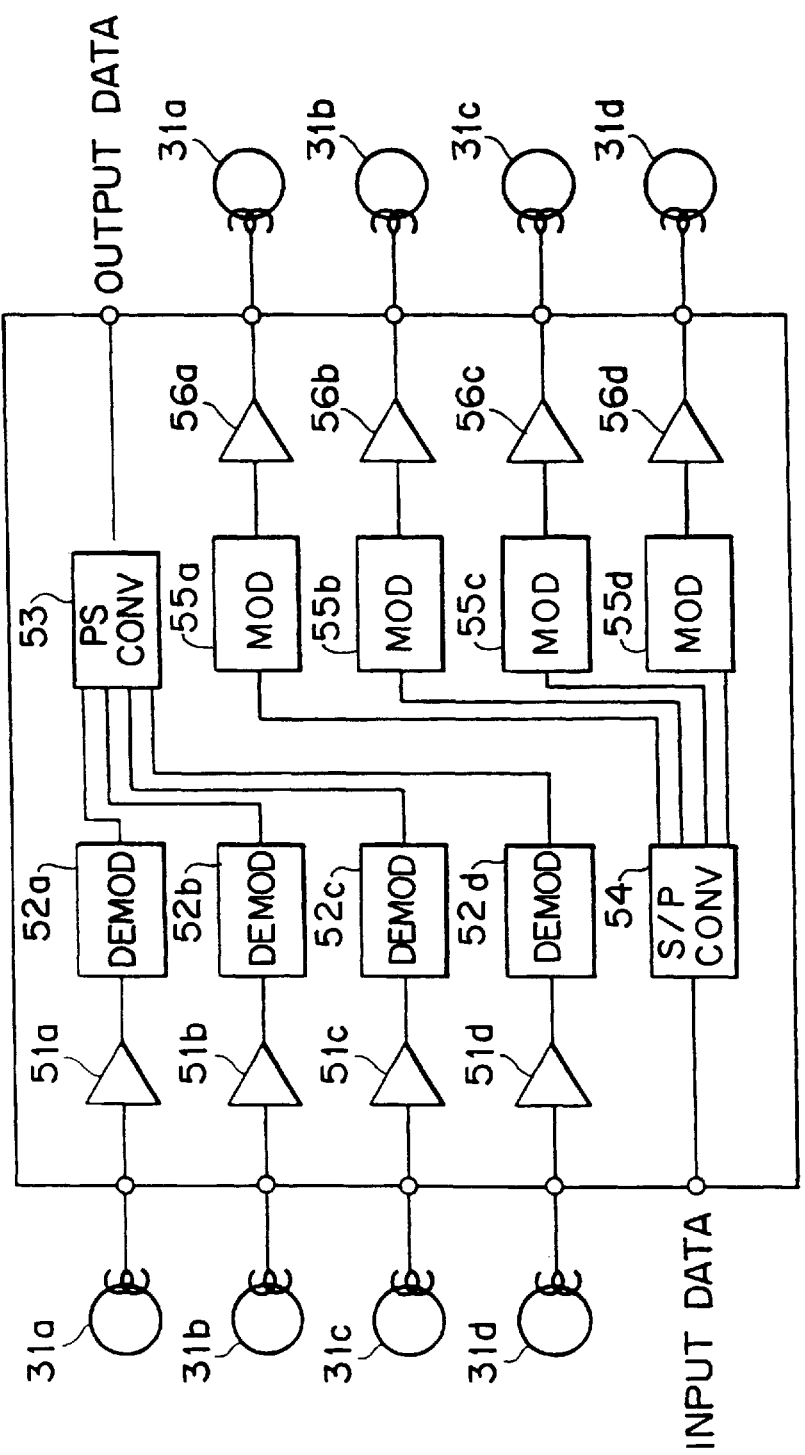
FIG. 6 is a block diagram of a recording/reproduction signal processing circuit of a magnetic head apparatus of the magnetic disk apparatus to which the present invention is applied.

Now, a circuit construction for controlling the magnetic heads 31a to 31d to operate simultaneously to record or reproduce data at a high speed is described with reference to FIG. 6.

First, in a reproduction system of the circuit shown, signals reproduced by the magnetic heads 31a to 31d are first amplified by reproduction amplifiers 51a to 51d, and data are demodulated from the signals by demodulators 52a to 52d, respectively. The demodulated data are converted back into original serial data by a parallel to serial converter 53 and outputted as such serial data from the circuit shown in FIG. 6.

Meanwhile, in a recording system of the circuit shown, data inputted serially are converted into parallel data by a serial to parallel converter 54 and modulated into recording signals by modulators 55a to 55d, and then amplified by recording amplifiers 56a to 56d, whereafter they are supplied to the magnetic heads 31a to 31d so that they are recorded in parallel onto different tracks of the respective corresponding magnetic disks.

As described above, by the magnetic heads 31a to 31d, parallel recording and/or reproduction of the number of data equal to the number of the magnetic heads can be performed, and consequently, the data transfer rate can be increased remarkably. For example, where two magnetic disks are involved and four magnetic heads are provided, since recording and/or reproduction can be performed simultaneously for tracks on four faces of the magnetic disks, a data transfer rate four times as high as that of a related art magnetic disk apparatus can be obtained, and a transfer rate of 100 Mbit/sec or more which is desirable for recording/reproduction of moving pictures can be realized. For an application which requires a higher data transfer rate, the number of magnetic disks should naturally be increased.

Further, while the magnetic disk apparatus described above is constructed such that series data are converted into parallel data which are recorded by respective magnetic heads whereas parallel data reproduced by the respective magnetic heads are converted into serial data to achieve augmentation of the recording and reproduction speeds, it may be modified such that each of the magnetic heads records or reproduces each serial data. The modified apparatus can be suitably applied to a multi-channel system.

Now, several disk type recording media suitable for use with the magnetic disk apparatus of the present invention is described with reference to FIGS. 7A to 9B.

Figure 7A:
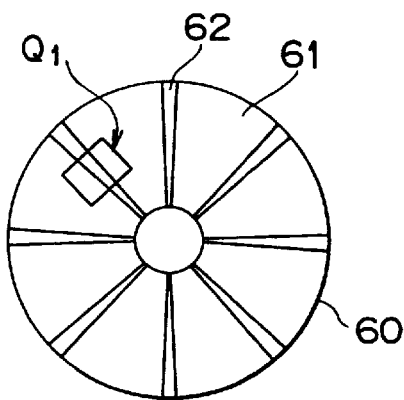
FIG. 7A is a plan view of an example of a pre-formatted disk suitable for use with the magnetic disk apparatus to which the present invention is applied and FIG. 7B is an enlarged perspective view showing a portion Q1 shown in FIG. 7A.

A first one of the disk type recording media is shown in FIG. 7A. Referring to FIG. 7A, the disk type recording medium shown is a magnetic disk 60 wherein magnetic films are formed by sputtering or the like on the surface of a base plate wherein recesses to be used for tracking of magnetic heads are formed on the non-magnetic recording base plate of a plastic material or the like using a molding technique such as injection molding. The magnetic disk 60 is circumferentially divided into a plurality of sectoral areas of data areas 61 and servo areas 62.

Figure 7B:
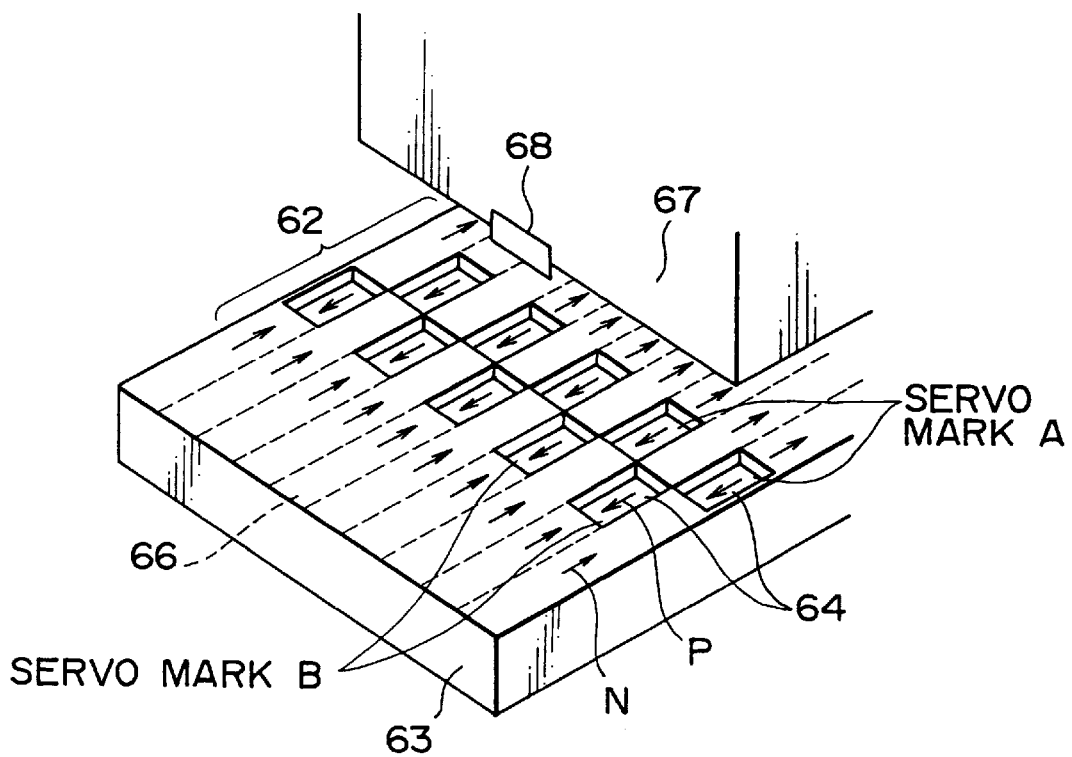

FIG. 7B is an enlarged view of a portion Q1 of the disk type recording medium of FIG. 7A. Referring to FIG. 7B, servo marks A and servo marks B are provided by forming recesses 64 at positions displaced from each other in each of the servo areas 62. A mark P is magnetized in each of the recesses 64 while a mark N is magnetized in each of flat portions in advance in the opposite directions to each other. A magnetic head 68 provided on a slider 67 detects a boundary between a mark P and another mark N, and a tracking error signal is produced from the signal from the magnetic head 68 then and a positional relationship between the servo mark A and the servo mark B. Then, the magnetic head 68 is controlled based on the tracking error signal so that it may travel along a track center 66 between the servo marks A and the servo marks B.

Where the magnetic disk 60 on which signals for serving are formed in advance in this manner is used as a recording medium, an initial servo writing step which is required in related arts is not required any more, and consequently, handling is facilitated.

Figure 8:
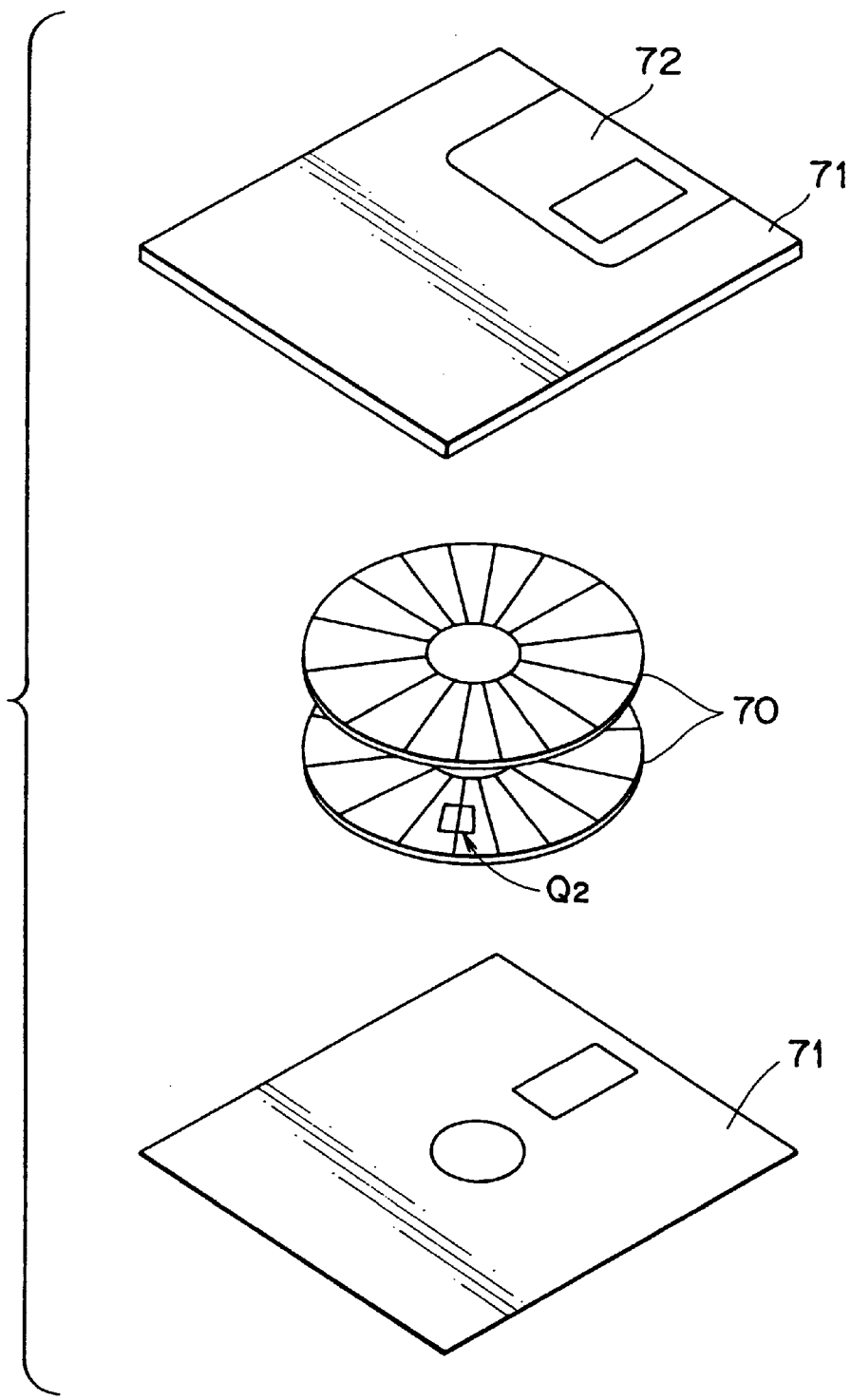
FIG. 8 is an exploded view showing a cartridge-contained disk suitable for use with the magnetic disk apparatus to which the present invention is applied.

A second one of the disk type recording media is shown in FIG. 8. Referring to FIG. 8, the disk type recording medium shown is a recording medium which is accommodated in a cartridge and can be removably and exchangeably loaded into a magnetic disk apparatus.

More particularly, a magnetic disk 70 is accommodated in a cartridge 71. The cartridge 71 has a window (not shown) formed therein for exposing, upon recording or reproduction, a recording face of the magnetic disk 70 therethrough, and includes a shutter 72 for opening or closing the window.

Figure 9A:
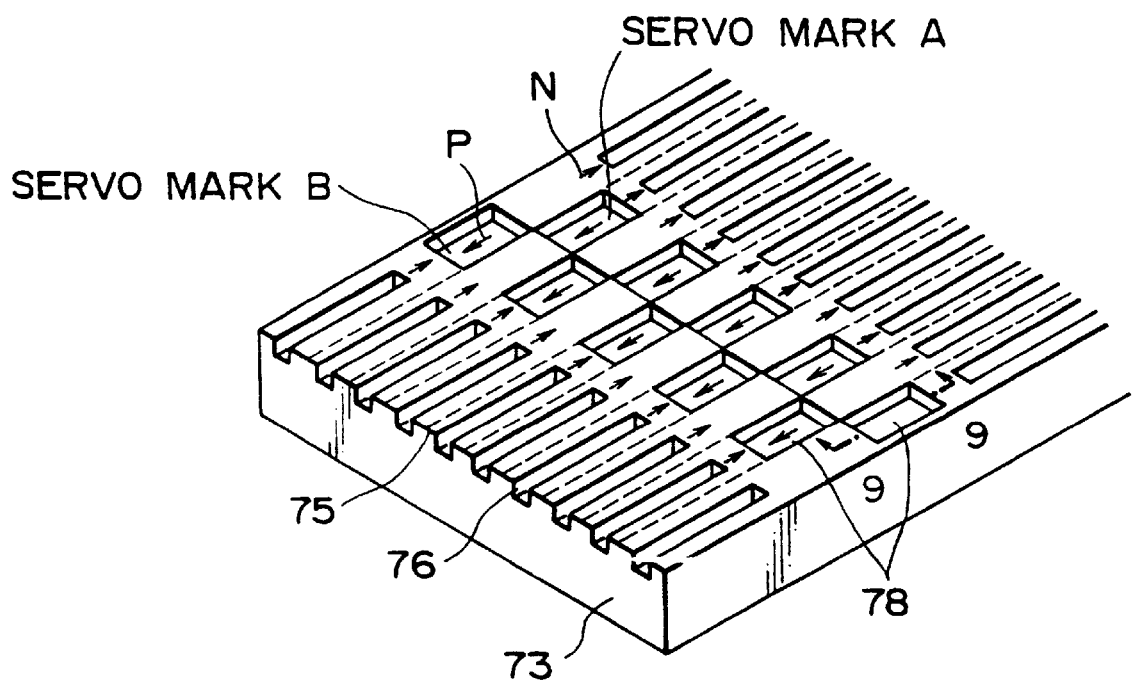
FIG. 9A is an enlarged view of a portion Q2 of the cartridge contained disk shown in FIG. 8
Figure 9B:
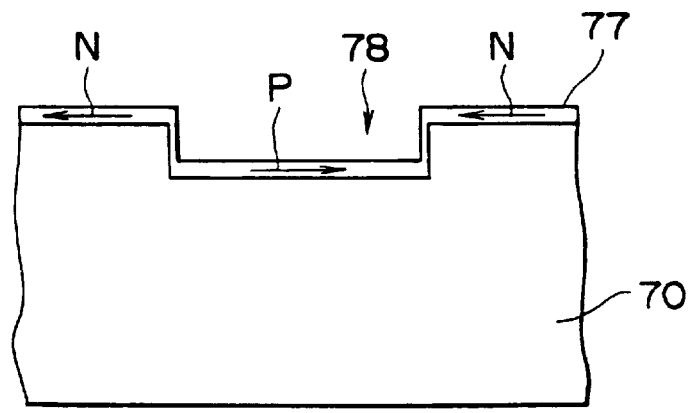
FIG. 9B is an enlarged sectional view taken along line 9—9 of FIG. 9A.
Figure 10:
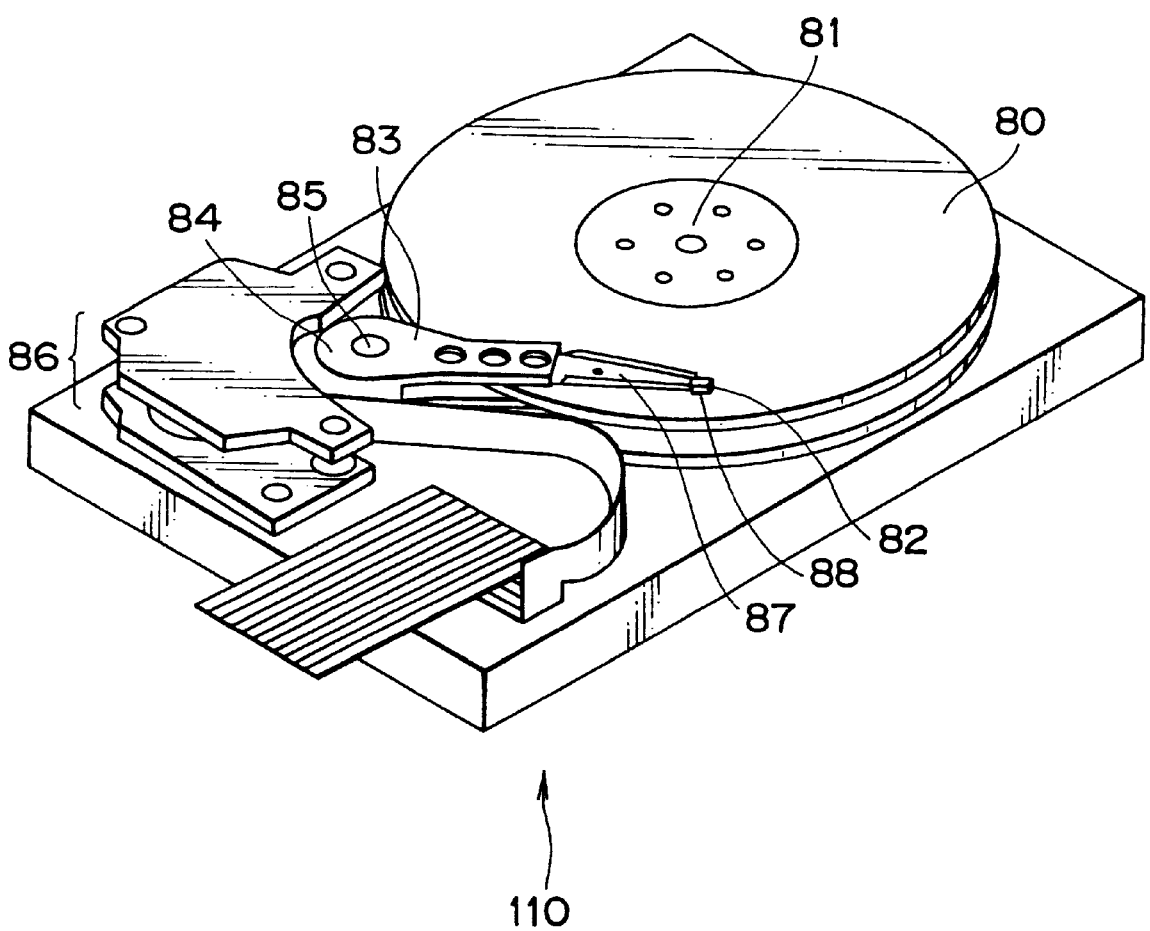
FIG. 10 is a perspective view showing an exemplary one of related art magnetic disk apparatus.

FIG. 9A shows a portion Q2 of the magnetic disk 70 shown in FIG. 8. Referring to FIG. 9A, servo marks A and servo marks B to be used for tracking control of a magnetic head are provided at positions displaced from each other by forming recesses 78 on a surface of the magnetic disk 70. Referring to FIG. 9B, a mark P is magnetized in each of the recesses 78 while another mark N is magnetized in a flat face portion in advance in the opposite directions to each other. A boundary between the mark P and the mark N is detected, and from this signal and a positional relationship of the servo marks A and the servo marks B, a tracking error signal is produced to control the magnetic head so that the magnetic head may travel along a track center 75 between a recess 78 and a flat face portion. Further, in order to eliminate otherwise possible interference with an adjacent track, a guard band groove 76 is provided between each adjacent ones of the tracks.

It is to be noted that the disk type recording medium accommodated in the cartridge 71 is not limited to such a pre-formatted disk as shown in FIGS. 9A and 9b, but may be an ordinary disk. Further, the number of disk type recording media to be accommodated in the cartridge 71 is not limited to one, but may naturally be a plural number.

A recording medium of the construction shown in FIGS. 8, 9A and 9B is removably and exchangeably loaded in the magnetic disk apparatus and can be suitably used for transportation of the same as an already recorded recording medium, loading into another production apparatus or the like, particularly for production of video images in addition to the high speed data transfer function of the magnetic disk apparatus of the present invention.

It is to be noted that the present invention is not limited to the specific embodiment described hereinabove and the magnetic disk apparatus of the present invention can be constructed in various manners such that it includes first driving means and second driving means which allow simultaneous recording and/or reproduction onto and/or from a plurality of disk type recording media.

What is claimed is:

1. A magnetic disk apparatus which includes a plurality of disk type magnetic recording media securely mounted on a rotary shaft of a rotational driving apparatus and a plurality of magnetic heads individually arranged adjacent respective faces of said plurality of disk type magnetic recording media to perform recording and reproduction, comprising:

a plurality of recording signal processing means provided respectively for said plurality of magnetic heads;

a plurality of reproduction signal processing means provided respectively for said plurality of magnetic heads;

recording signal control means for controlling a relationship among recording signals input to said magnetic heads;

reproduction signal control means for controlling a relationship among reproduction signals output from said magnetic heads;

first driving means for pivoting all of said magnetic heads integrally with each other to position said magnetic heads roughly to predetermined information tracks of the corresponding recording faces of said disk type magnetic recording media;

a plurality of second driving means formed of piezoelectric elements provided respectively for said plurality of magnetic heads for positioning the corresponding magnetic heads precisely to the predetermined information tracks of the corresponding recording faces of said disk type magnetic recording media;

a plurality of inputting means provided respectively for said plurality of magnetic heads for inputting serial data trains to be recorded; and a plurality of outputting means provided respectively for said plurality of magnetic heads for outputting reproduced serial data trains, whereby a plurality of data trains are recorded and/or reproduced simultaneously, wherein all of said magnetic heads are pivoted integrally with each other by said first driving means so as to be positioned roughly to the predetermined information tracks, whereafter said magnetic heads are individually positioned precisely to the predetermined information tracks of the corresponding recording surfaces of said disk type magnetic recording media by corresponding ones of said second driving means;

each of said disk type magnetic recording media is divided into servo areas and data areas, said servo areas containing a plurality of first and second recessed servo marks located on either side of a center of the predetermined information tracks and displaced from each other for detecting a tracking error;

said information tracks are separated by recessed guard band grooves;

said recording signal control means includes means for converting serial data to be recorded into parallel data having a number of channels corresponding respectively to said plurality of magnetic heads, and said reproduction signal control means includes means for converting parallel data output from said magnetic heads into serial data, whereby serial data are recorded in parallel and recorded parallel data are reproduced as serial data;

said first and second recessed servo marks are magnetized in a direction opposite to that of a preceding portion of said plurality of disk type magnetic recording media; and said plurality of disk type magnetic recording media are formed on a non-magnetic recording base plate of a plastic material using a molding technique of injection molding.

* * * * *